US011444748B2

(12) United States Patent
Kounavis

(10) Patent No.: US 11,444,748 B2
(45) Date of Patent: Sep. 13, 2022

(54) ULTRA-LOW LATENCY ADVANCED ENCRYPTION STANDARD

(71) Applicant: INTEL CORPORATION, Santa Clara, CA (US)

(72) Inventor: Michael Kounavis, Portland, OR (US)

(73) Assignee: INTEL CORPORATION, Santa Clara, CA (US)

(*) Notice: Subject to any disclaimer, the term of this patent is extended or adjusted under 35 U.S.C. 154(b) by 562 days.

(21) Appl. No.: 16/369,103

(22) Filed: Mar. 29, 2019

(65) Prior Publication Data

US 2019/0229889 A1 Jul. 25, 2019

(51) Int. Cl.
*H04L 9/06* (2006.01)
*H04L 9/30* (2006.01)

(52) U.S. Cl.
CPC .......... *H04L 9/0631* (2013.01); *H04L 9/3026* (2013.01); *H04L 2209/122* (2013.01)

(58) Field of Classification Search
CPC ................ H04L 9/0631; H04L 9/3026; H04L 2209/122
See application file for complete search history.

(56) References Cited

U.S. PATENT DOCUMENTS

2015/0086007 A1   3/2015   Mathew et al.

FOREIGN PATENT DOCUMENTS

CN   103391186 B   2/2016
EP   3737031 A1 * 11/2020 ........... G06F 9/3895

OTHER PUBLICATIONS

Siladi, Vladimir et al. "Adapted Parallel Quine-McCluskey Algorithm Using GPGPU." IEEE Xplore, IEEE 14th International Scientific Conference on Informatics, 2017, https://ieeexplore.ieee.org/stamp/stamp.jsp?arnumber=8327269, Accessed Dec. 17, 2021 (Year: 2017).*
Sanu, Mathew K. "53 Gbps Native GF(24)2 Composite-Field AES-Encrypt/Decrypt Accelerator for Content-Protection in 45 Nm High-Performance Microprocessors." IEEE Xplore, IEEE Journal of Solid-State Circuits, Apr. 2011, https://ieeexplore.ieee.org/stamp/stamp.jsp?arnumber=5719132.vol. 46, No. 4 (Year: 2011).*
Joan Boyar et al. "A New Combination Logic Minimization Technique with Application to Cryptlogy", May 20, 2010, Experimental Algorithms, Springer Berlin Heidelberg, Berlin, ISBN: 978-3-642-13192-9 (Year: 2010).*

(Continued)

*Primary Examiner* — Oleg Korsak
(74) *Attorney, Agent, or Firm* — KDB Firm PLLC

(57) ABSTRACT

In one example, an apparatus for Advanced Encryption Standard (AES) substitutions box (S-box) encryption includes an S-Box logic function and a MixColumns multiplication operation. The S-box logic function takes as input a state and is an 8-bit to 8-bit logic function, and wherein the S-box logic function is minimized such that an S-box round comprises nine not-and (NAND) levels and duplications of a logical product of the minimized S-box logic function are eliminated. The MixColumns multiplication operation comprises a plurality of factors that are exclusive ORed (XOR) with an output of the S-box round to obtain a scaled 16-byte output.

9 Claims, 10 Drawing Sheets

(56) References Cited

OTHER PUBLICATIONS

S. Zhao, C. Wang and J. Sun, "Improvement and implementation of quine-McCluskey algorithm for synthesis of reversible logic circuits," 2017 IEEE 2nd Advanced Information Technology, Electronic and Automation Control Conference (IAEAC), 2017, pp. 640-642, doi: 10.1109/IAEAC.2017.8054094 (Year: 2017).*
Morioka, Sumio and Satoh, Akashi: "A 10 Gbps Full-AES Crypto Design with a Twisted-BDD S-Box Architecture" Source: IEEE Xplore Conference Paper, Jun. 2002 IBM Research, Tokyo Research Laboratory, 1623-14 Shimotsuruma, Yamato, Kanagawa 242-8502, Japan 8 pages.
Sanu K Mathew et al., "53 Gbps Native $GF(2^{\wedge}4)^{\wedge}2$ Composite-Field AES-Encrypt/Decrypt Accelerator for Content-Protection in 45 nm High-Performance Microprocessors", IEE Journal of Solid-State Circuits, IEEE, USA, vol. 46, No. 4, Apr. 1, 2011 pp. 767-776.
Joan Boyar et al., "A new combinational logic minimization technique with applications to cryptology", May 20, 2012, Experimental Algorithms, Springer Berlin Heidelberg, Berlin, Beidelberg, pp. 178-189.
Roberto Avanzil: "The QARMA Block Cipher Family Almost MDS Matrices Over Rings With Zero Divisors, Nearly Symmetric Even-Mansour Constructions With Non-Involutory Central Rounds, and Search Heuristics for Low-Latency S-Boxes", IACR, International Association for Crypotologic Research, vol. 20170227:135829, Feb. 27, 2017, pp. 1-40.
European Search Report and Written Opinion for the International Patent Application No. EP20159145, dated Nov. 19, 2020, 11 pages.

* cited by examiner

300

700

800

US 11,444,748 B2

ULTRA-LOW LATENCY ADVANCED ENCRYPTION STANDARD

TECHNICAL FIELD

This disclosure relates generally to cryptographic algorithms. In particular, this disclosure relates to low latency implementations of the Advanced Encryption Standard (AES).

BACKGROUND

The Advanced Encryption Standard (AES) is a symmetric block cipher that can encrypt and decrypt information. The AES was announced in Nov. 26, 2001 by the National Institute of Standards and Technology (NIST) as U.S. FIPS PUB 197 (FIPS 197).

BRIEF DESCRIPTION OF THE DRAWINGS

The following detailed description may be better understood by referencing the accompanying drawings, which contain specific examples of numerous features of the disclosed subject matter.

In some cases, the same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
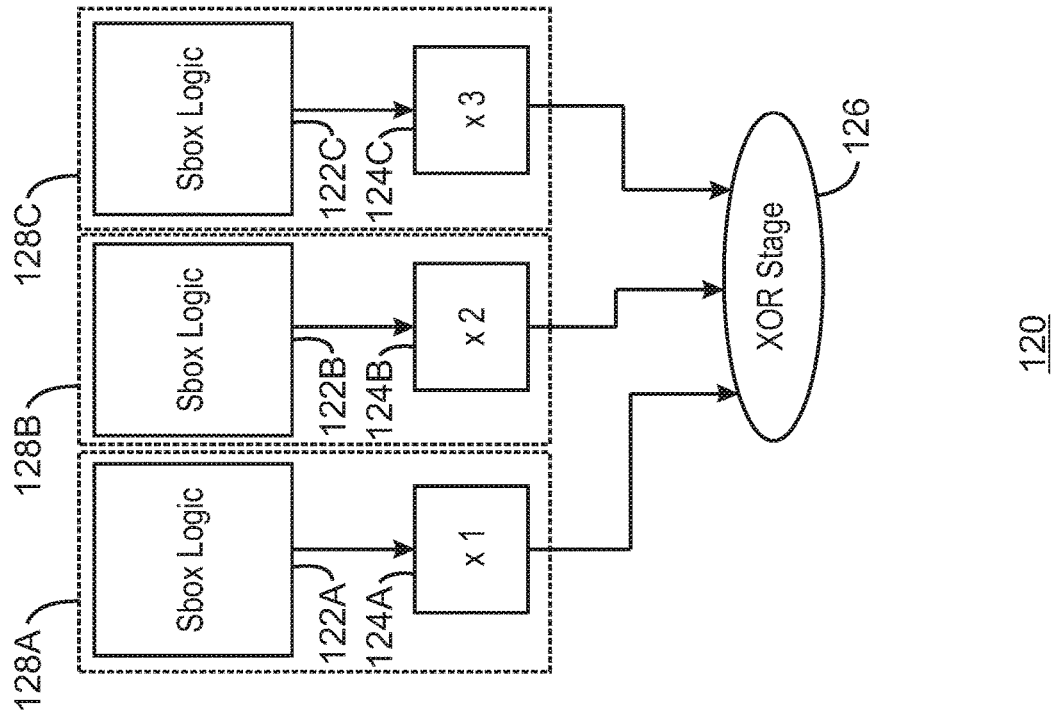
FIG. 1 is a block diagram of two exemplary S-box variants.
Figure 1:
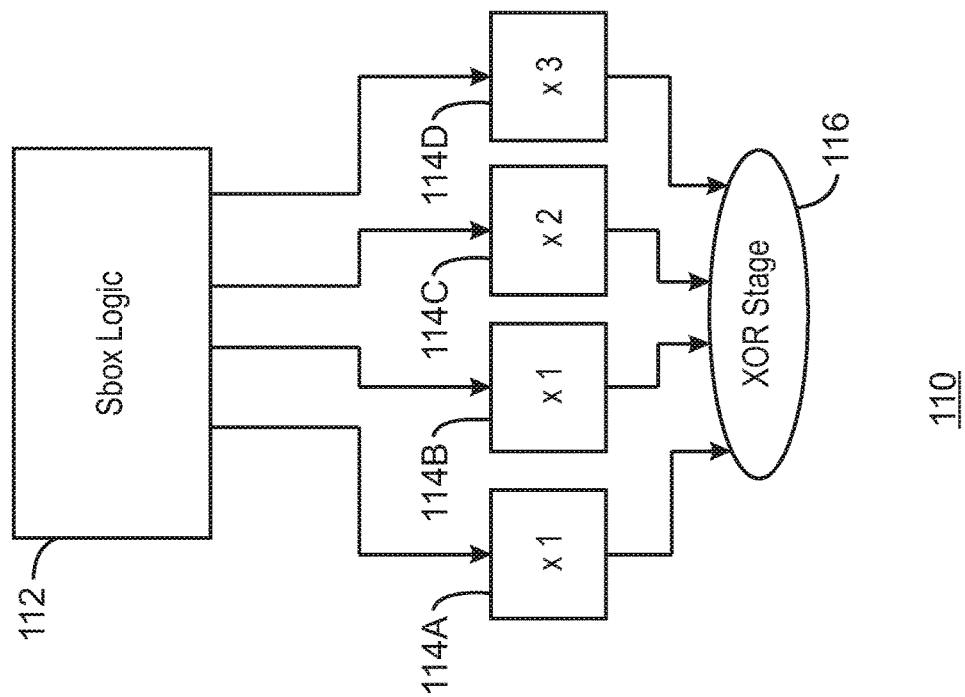

Encryption is commonly supported using the Advanced Encryption Standard (AES), based on the Rijndael block cipher. In an exemplary AES implementation, a series of transformations is executed using the secret key (cipher key) to transform intelligible data referred to as "plaintext" into an unintelligible form referred to as "cipher text." The transformations in the cipher include key expansion, substitution box (S-box), ShiftRows, MixColumns, and AddRoundKey. The key size used for an AES cipher specifies the number of transformation rounds that convert the plaintext into ciphertext. Each round consists of several processing steps, including one that depends on the encryption key itself. A set of reverse rounds are applied to transform ciphertext back into the original plaintext using the same encryption key. For ease of description, AES functionality may be described using a single round as an example. However, the present techniques may be applied to an entire AES block. The AES block includes all AES rounds according to a particular key size. The Rijndael algorithm is specified in the AES standard to process data blocks of 128 bits, using cipher keys with lengths of 128, 192 and 256 bits. The different key lengths are typically referred to as AES-128, AES-192 and AES-256, respectively. The AES algorithm transforms the plaintext into cipher text or cipher text into plaintext in 10, 12, or 14 consecutive rounds, with the number of rounds dependent on the length of the key.

In key expansion, Rijndael's key schedule transforms the keys of size 128, 192 or 256 bits into 10, 12, or 14 round keys of 128 bits, respectively. A round key may be a value derived from the cipher key. The round keys are used to process the plaintext data in rounds as 128-bit blocks. The plaintext data is configured as a four by four (4×4) column-major order array of bytes, and is ultimately converted to ciphertext blocks. In examples, the a round key may be added to the state using an Exclusive-OR (XOR) operation.

An S-box is operable to process the state using a non-linear byte substitution table. For example, in a 128-bit (16 bytes) input to the round, each byte is replaced by another byte according to a lookup table. The S-box is computationally intensive and the most computationally complex transformation of AES. The present techniques, as described below, enable a reduction in complexity of the S-box transformation.

In ShiftRows or the Shiftrows transformation, the last three rows of the state are cyclically shifted by different offsets. For example, row zero may be shifted by 0 bytes, row one may be shifted by 1 byte, row two may be shifted by 2 bytes and row three may be shifted by 3 bytes. However, ShiftRows may be considered a simple re-wiring function, and thus represents a negligible addition to the AES circuitry. In embodiments, Shiftrows may be a specific permutation that is independent of the field.

In MixColumns, the columns of the state are mixed independently of the other columns to produce new columns. The MixColumns function takes four bytes as input and outputs four bytes, where each input byte affects all four output bytes. For example, the state may be a 16-byte state that is divided into four columns. Traditionally, the state input to MixColumns is the output of the S-box that has been shifted according to the Shiftrows transformation.

The present techniques enable an AES block that encrypts/decrypts data in approximately two clock pulses or cycles via a reduction in the critical path delay. The present techniques reduce the latency of the S-box logic, while enabling the same processing throughput and area of traditional S-box implementations. In examples, the critical path delay may be the least number of serially connected gates in the critical path. The critical path is defined as the path between an input and an output with the maximum delay. For ease of description, the present techniques have been described via an exemplary AES-128 implementation. However, any AES implementation can be used.

A first variant and a second variant of an AES-128 implementation are described herein that reduce the critical path latency of an AES block to 90 NAND levels and 30 XOR levels, and 90 NAND levels and 50 XOR levels, respectively. The critical path latency for the faster first variant is 1.35 ns in the 10 nanometer (nm) semiconductor process technology. The critical path latency for the second variant is 1.65 ns in the 10 nm process. To achieve the reduction in NAND levels, the present techniques enable S-box functionality with nine NAND levels. Traditional AES implementations require many more NAND levels. In an example, the total number of gates used to implement the S-box in a single round is 1218 gates, with the number of gates for the entire AES block being approximately two-hundred thousand excluding the key schedule, and approximately two-hundred forty thousand gates with the key schedule. In embodiments, the particular number of NAND gates used to express the S-box as described herein may range from 1200-1250 gates. This is smaller than the gate count of other traditional solutions. The area of the modified S-box is reasonable, where by "reasonable" it is meant that the S-Box area does not exceed the area of 2,000 gates, as discussed below.

Reference in the specification to "one embodiment" or "an embodiment" of the disclosed subject matter means that a particular feature, structure, or characteristic described in connection with the embodiment is included in at least one embodiment of the disclosed subject matter. Thus, the phrase "in one embodiment" may appear in various places throughout the specification, but the phrase may not necessarily refer to the same embodiment.

The present techniques reduce the latency of the S-box logic, while enabling the same processing throughput and area of traditional S-box implementations by efficiently realizing 8-bit to 8-bit logic functions, also known as Boolean functions. The logic functions employ two novel heuristics for efficiently implementing the Quine-McCluskey algorithm as applied S-box to logic functions. As described herein, the Quine-McCluskey algorithm optimizes logic functions and selects logical products. The logical products may be referred to as "implicants," which simplify logic function representations. The Quine-McCluskey algorithm is computationally intensive, associated with exponential complexity, and often considered impractical for large or complex logic functions.

The present techniques augment the Quine-McCluskey algorithm with two heuristic processes. To efficiently execute these two processes, the logic function of the S-box is written as a sum of minterms or the minterm expansion of the logic function is determined, and the Quine-McCluskey algorithm is used to minimize the logic function. The first heuristic process used to augment the Quine-McCluskey algorithm is a maximal prime coverage search algorithm as described below. The maximal prime coverage search algorithm derives a simplified logic function representation, where "'simplified" indicates a representation with significantly fewer logical products and logical sums with a sum-of-minterms presentation and is characterized by polynomial complexity when compared to a traditional algorithm, such as Petrick's Method.

The second heuristic process used to modify the traditional Quine-McCluskey algorithm is a divide-and-conquer substitute search algorithm which further simplifies the logic function representations of the S-Box. These heuristic processes are applied not only to the S-Box, but also to tweaked S-Box functions that combine the S-Box transformation with multiplication with the factors 0x2, 0x3, 0x9, 0xb, 0xd and 0xe, encountered in the MixColumns and inverse MixColumns transformation as described by FIGS. 1 and 2.

Most AES implementations use either composite fields or Fermat inversion to efficiently implement the S-box function. The S-box function is typically considered the main compute intensive part of the AES. Traditional composite fields result in an area efficient S-box realization (usually requiring 300-500 NAND gates). However, the use of composite fields results in a significant latency along the critical path (typically being 40 NAND levels or higher per S-box).

Other implementations employ Binary Decision Diagrams (BDDs), which reduce the latency of the S-box to approximately 10-20 NAND levels. However, this BDDs require a significant area, typically 2000-4000 NAND gates per S-box. By contrast, the present techniques incur a latency cost of only 9 NAND levels and 1218 NAND gates per S-box. As used herein, a level refers to a logical process, where an input is not available to a particular level until the output of a previous level is available. Each level may consist of a number of logic gates. In an example, the present techniques may use approximately 1218 NAND gates for an S-box, which is approximately three to four times more than a traditional implementation. However, the additional gates are configured to produce results in a significantly smaller number of dependent steps when compared with previous, traditional solutions. As used herein, dependent steps describe a sequence of steps where the processing cannot be parallelized, because the next step depends on the values of the previous step.

To realize this reduction in latency and efficiently execute the Quine-McCluskey algorithm, the logic function (e.g., Boolean function) can be expressed as a sum of minterms. A minterm is a logical product that involves all variables (i.e., bits) of the input, and where each variable appears either as is or inverted. A correspondence can be introduced between the inverted form of a variable and the binary number 0, and between the non-inverted form of a variable and the binary number 1. In this manner, each minterm can be expressed as a binary sequence of zeros and ones. For example, the following minterm can be expressed as the binary sequence 10110100, which is the decimal number 180.

$i_7 \cdot (\sim i_6) \cdot i_5 \cdot i_4 \cdot (\sim i_3) \cdot i_2 \cdot (\sim i_1) \cdot (\sim i_0)$ Such a number is often called a "prime," in the context of logic design. Hence, a logic function, which is expressed as a sum of minterms, is also associated with a set of primes, using this correspondence.

Consider a set of primes of bit length n, for which primes have some k bit values in common, and where in all other m=n-k bit positions the set displays all possible $2^m$ binary values. Such set of primes may be referred to as an "implicant." For example, the set of primes containing the following values:

180=10110100b, 181=10110101b, 188=10111100b and 189=10111101b form the following implicant:

1011x10x or $i_7 \cdot (\sim i_6) \cdot i_5 \cdot i_4 \cdot i_2 \cdot (\sim i_1)$, which is an implicant of size four. From the definition of an implicant, it becomes apparent that each logic function can not only be expressed as a set of primes, but also as a set of implicants. The implicants that are formed by performing a maximal grouping of primes into implicants are called "prime implicants." As used herein, maximal groupings of primes is used to indicate groupings for which no other sets exist that contain these primes, and they are also implicants. Put another way, the implicant that corresponds to or is associated with the largest grouping of primes in primes that have bit values in common can be referred to as a prime implicant.

An implicant I "contains" a prime p, or "is associated" with a prime p, if this implicant is formed by a set of primes which includes p. Similarly, a logical product P is part of an implicant I if implicant I can be expressed as $I=P \cdot P_1$ where $P_1$ is some other logical product. Moreover, an implicant I, which is part of some logic function F, is "essential" if it contains some prime $p_1$ which is not contained in any other implicant of F. Put another way, an essential prime implicant is a prime implicant that covers at least one case that cannot be covered by any combination of other prime implicants.

In some cases, expressing a logic function as a set of prime implicants is not the optimal way to simplify the logic function. In fact, every logic function usually needs only a subset of its prime implicants in order to be optimally expressed. This subset includes all essential implicants plus some other non-essential implicants, which should cover all primes of the logic function. The present techniques select and optimize non-essential implicants in the context of the AES S-box logic function design to reduce AES encryption time to no more than three clock cycles.

FIG. 1 is a block diagram 100 of two exemplary S-box variants 110 and 120. As discussed above, an S-Box is a part of the AES data path. In embodiments, an AES data path may include each of an encrypt data path and a decrypt data path. The encrypt round may include various stages, such as key expansion, substitution box (S-box), ShiftRows, MixColumns, and AddRoundKey. The decrypt round may include various stages, such as Inverse ShiftRows, Inverse S-box, MixColumns, AddRoundKey, and Inverse MixColumns.

Figure 2:
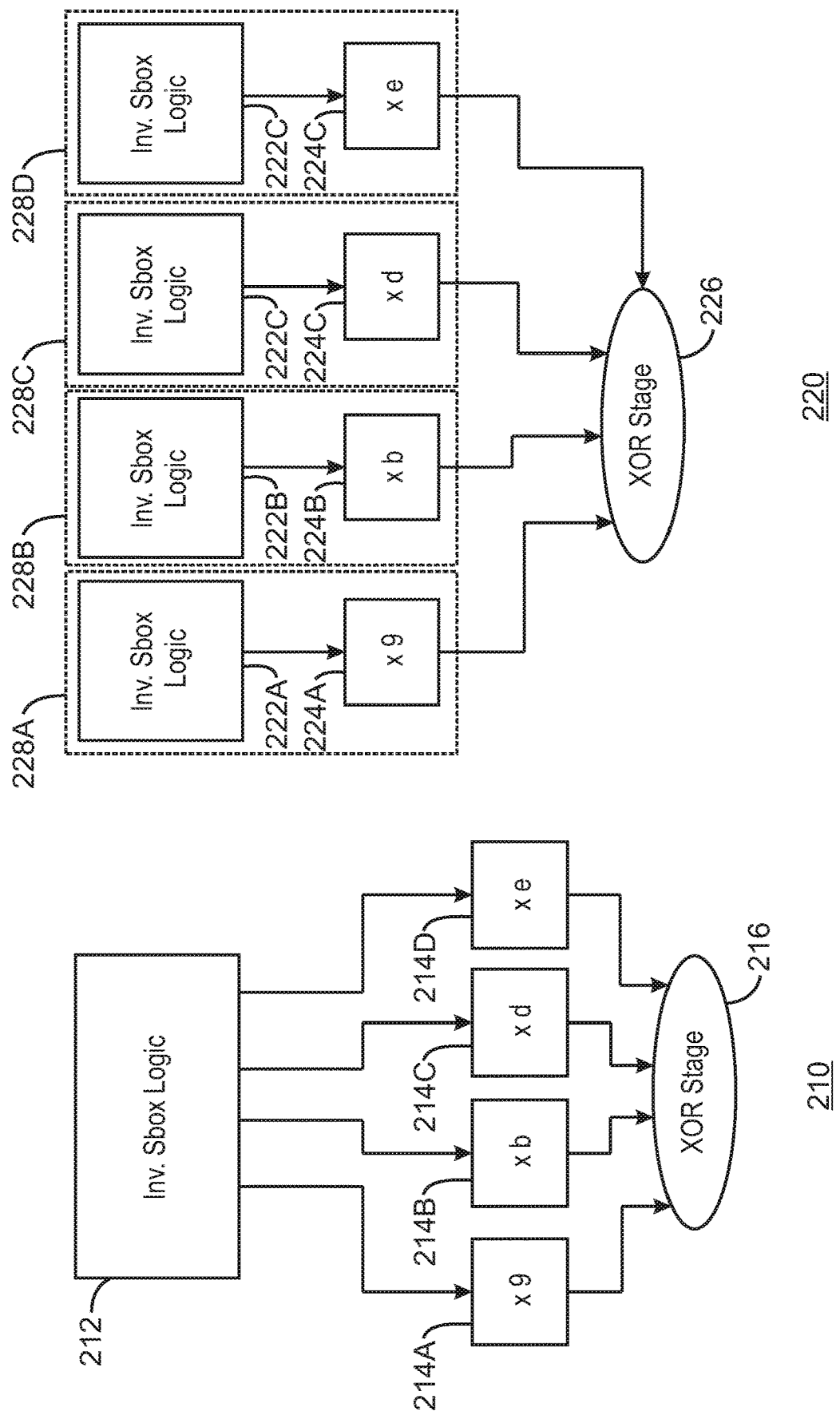
FIG. 2 is a block diagram of two exemplary inverse S-box variants.

A first S-box variant 110 is illustrated without any grouping. A second S-Box variant 120 is illustrated with grouping. In the example of FIG. 2, each S-box variant 110 and 120 may be considered a single encrypt round of the AES. Rather than employing composite fields, Fermat inversion, or other techniques to implement the AES S-box, the present techniques configure the S-box as an 8-bit to 8-bit logic function and optimizes the function such that only nine levels are used to realize the S-box functionality. Put another way, the maximum number of logical processes cascaded between any input and output of the S-box is nine. This 8-bit by 8-bit logic function implementation can be extended to the subsequent MixColumns transformation. In particular, independent S-box logic can be grouped to according to the factors found in MixColumns as illustrated in variant 120. Grouping, as described herein, combines the S-box circuitry and the multiplication from MixColumns circuitry into a single logic function. In embodiments, when the S-box circuitry and the MixColumns circuitry are grouped, the MixColumns multiplication operation may be directly performed on the data output from the S-box, without the use of a register to store the output from the S-box prior to multiplication as previously located in MixColumns.

Each of the column of the 16-byte state is viewed as four coefficients of a polynomial in a finite field, such as Galois Field $2^8$ (GF($2^8$)), and multiplied by an invertible linear transformation during the MixColumns transformation. The invertible linear transformation may be enabled by matrix multiplication in the Rijndael Galois Field. In embodiments, the matrix is a known matrix. In an example of a 128-bit key according to AES, the MixColumns transformation can be executed as multiplication by a particular circular maximum distance separable (MDS) matrix in a finite field.

In the MixColumns transformation of AES, the columns of the state are evaluated as polynomials over GF($2^8$) and multiplied modulo $X^4+1$ with a fixed polynomial c(x), given by $$c(x) = \text{`03'}x^3 + \text{`01'}x^2 + \text{`01'}x + \text{`02'}$$

Similarly, decryption (inverse cipher) performs a series of transformations using the cipher key to transform the ciphertext blocks into plaintext blocks of the same size. The transformations in the inverse cipher are the inverse of the transformations in the cipher. For inverse MixColumns, every column is transformed by multiplying it with a specific multiplication polynomial d(x), given by $$d(x) = \text{`0B'}x^3 + \text{`0D'}x^2 + \text{`09'}x + \text{`0E'}$$

Thus, the MixColumns transformation multiplies each S-box output with the factors 0x01, 0x02 and 0x03 in the field GF($2^8$) and performs an XOR operation between the outputs of such operations. In embodiments, the MixColumns transformation may be implemented as a matrix multiplication, where incoming bytes of data may be multiplied with the pre-determined scaling factors and combined via the XOR operation to get an output data byte.

In variant 110, the S-box logic 112 outputs a column of data to each multiplication 114A, 114B, 114C, and 114D for multiplication with pre-determined factors 1, 1, 2, and 3, respectively. At XOR 116, four bytes of data may be added together via an XOR operation to obtain an output byte. In variant 120, the multiplication with the factors in the field GF($2^8$) integrated into the S-box logic function that is modified as described herein, which in turn reduces the number of XOR levels that follow the S-box by two. Put another way, the combination of the S-Box with the scaling from MixColumns into a single logic function enables a reduction of two XOR levels. This reduction may occur in levels after the completion of the S-box transformation. The total latency of an AES round in variant 120 is the latency of nine NAND levels plus three XOR levels. If the grouping is not enabled as in the variant 120, the total latency of an AES round is nine NAND levels and five XOR levels (as in variant 110). The critical path latency for the faster variant 120 is 1.35 ns in the 10 nanometer (nm) semiconductor process technology. The critical path latency for the variant 110 is 1.65 ns in the 10 nm process.

Variant 120 includes three logic functions 128A, 128B, and 128C. Each logic function includes independent S-box logic and MixColumns multiplication logic. The logic function 128A includes S-box logic 122A and multiplication 124A. The logic function 128B includes S-box logic 122B and multiplication 124B. The logic function 128C includes S-box logic 122C and multiplication 124C. Each S-box logic 122 outputs a column of data to each multiplication 124 for scaling.

FIG. 2 is a block diagram 200 of two exemplary inverse S-box variants 210 and 220. In variant 210, the inverse S-box logic 212 outputs a column of data to each multiplication 214A, 214B, 214C, and 214D for multiplication with pre-determined factors 9, b, d, and e, respectively. At XOR 216, four bytes of data may be added together via an XOR operation to obtain an output byte. Variant 220 includes four logic functions 228A, 228B, and 228C. Each logic function includes independent inverse S-box logic and multiplication logic. The logic function 228A includes inverse S-box logic 222A and multiplication 224A. The logic function 228B includes inverse S-box logic 222B and multiplication 224B. The logic function 228C includes Inverse S-box logic 222C and multiplication 224C. The logic function 228D includes Inverse S-box logic 222D and multiplication 224D. Each Inverse S-box logic 222 outputs a column of data to each multiplication 224 for scaling.

The Inverse MixColumns transformation multiplies each inverse S-box output with the factors 0x09, 0x0b, 0x0d and 0x0e over the field GF($2^8$) and performs XOR operation between the outputs of such operations. Similarly, the present techniques configure the multiplication by these factors as part of the S-box logic function being optimized. This reduces the number of XOR levels that follow the S-box by two. While the present techniques have been described using a particular representation and finite field, the S-box and inverse S-box as described FIGS. 1 and 2 may apply to any other homomorphic representation of the field $GF(2^8)$. Thus, the coefficients or factors described herein may change according to the particular representation of the S-box.

Figure 3:
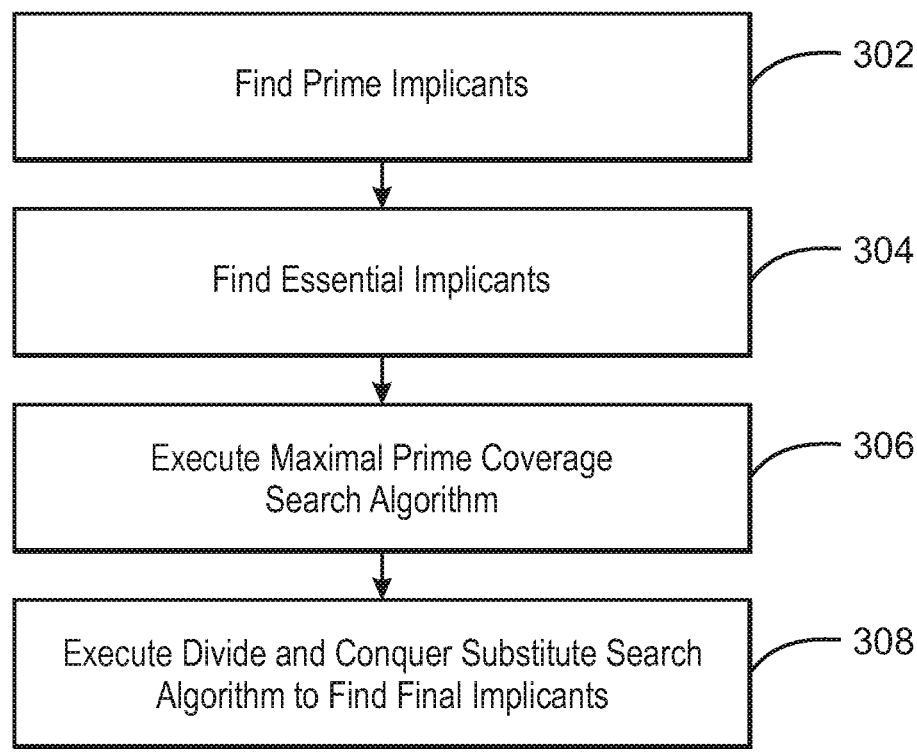
FIG. 3 is a process flow diagram of a method that enables ultra-low latency AES.

FIG. 3 is a process flow diagram of a method that enables ultra-low latency AES. The method 300 does execute an exhaustive search to select the remaining implicants. Moreover, the present techniques do not use Petrick's algorithm. Instead, the present techniques execute a maximal prime coverage search algorithm and a divide and conquer substitute search algorithm to find final implicants.

At block 302, the prime implicants of a logic function are determined. At block 304, the essential implicants are determined from the prime implicants of the logic function. A naïve approach then applies an exhaustive search approach to select implicants from those that are not essential that simplify the logic function expression the most. Other traditional AES implementations apply Petrick's algorithm. Both the exhaustive search and Petrick's algorithm are characterized by significant complexity, which is exponential. Moreover, the exhaustive search and Petrick's algorithm are practically difficult to implement, especially for functions like the S-box, where primes and implicants are in the order of 256.

At block 306, a maximal prime coverage search algorithm is implemented. The maximal prime coverage search returns a set of essential implicants and selected implicants. This is further described with respect to FIG. 4. At block 308, a divide and conquer substitute search algorithm is executed to find final implicants. The final implicants may include a list of substitutes, and is further described with respect to FIG. 5. In embodiments, the maximal prime coverage search, which is associated with polynomial complexity and is followed by a divide-and-conquer substitute search, which further simplifies the logic expressions.

Figure 4:
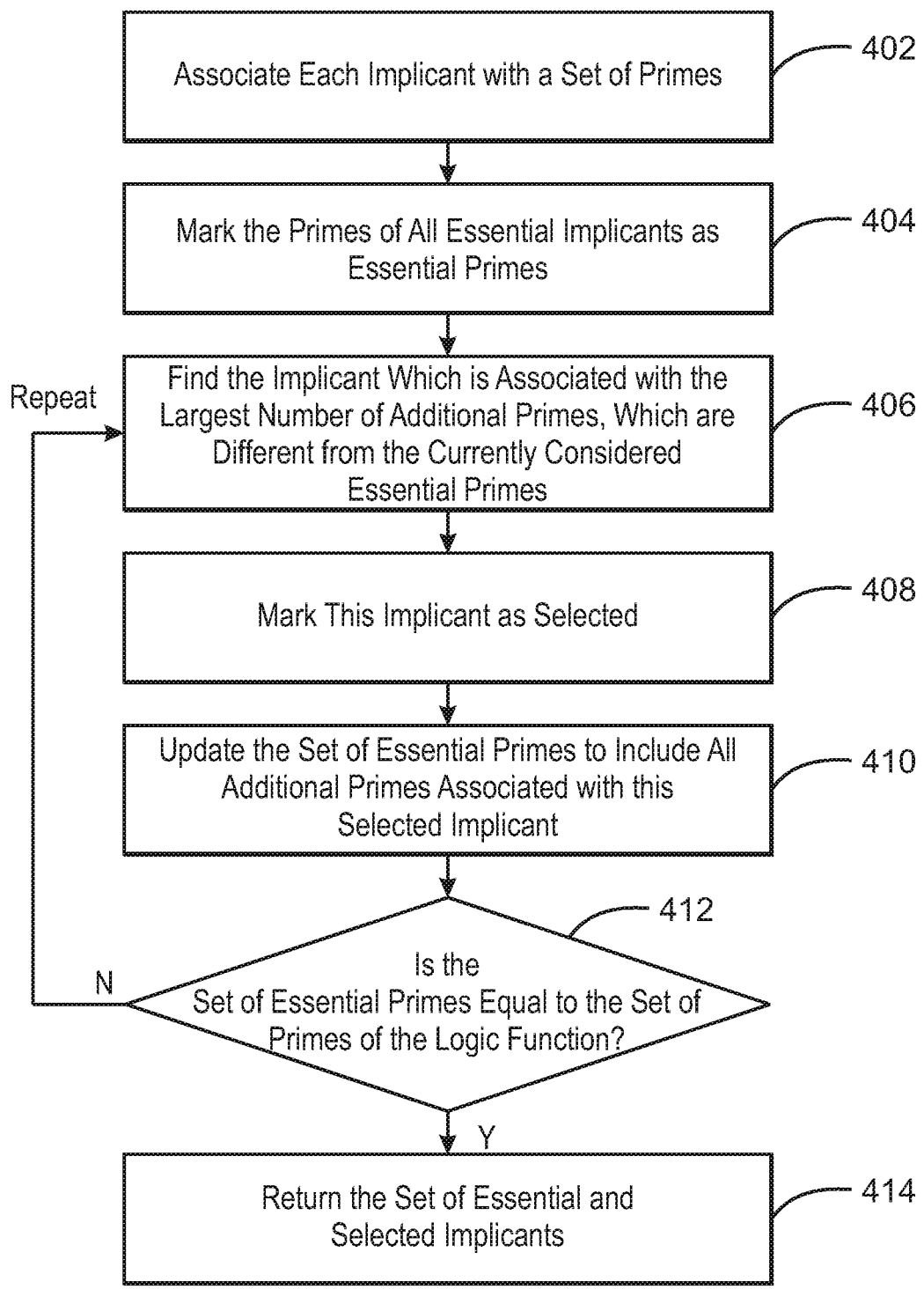
FIG. 4 is a process flow diagram of a method that enables a maximal prime coverage search.

FIG. 4 is a process flow diagram of a method 400 that enables a maximal prime coverage search. At block 402, each implicant of a logic function is associated with a set of primes. In embodiments, these are the primes which the implicant contains. At block 404, the primes of all essential implicants are marked as essential primes. At block 406, the implicant that is associated with the largest number of additional primes is found. The largest number of additional primes are different from the currently considered essential primes. At this point, the additional primes are not considered essential primes. An iterative process begins at block 406. At block 406, the maximal prime coverage search determines the implicant which is associated with or contains the largest number of additional primes, which are different from the currently considered essential primes.

At block 408, the implicant found at block 406 is marked as selected. At block 410, the set of essential primes is updated to include all additional primes associated with the selected implicant. Subsequently, the algorithm updates the set of essential primes to include all additional primes associated with the selected implicant.

At decision block 412, it is determined if the set of essential primes is equal to the set of primes of the logic function. If the set of essential primes is equal to the set of primes of the logic function, process flow continues to block 414. If the set of essential primes is not equal to the set of primes of the logic function, process flow returns to block 406, where the next implicant which is associated with the largest number of additional primes is found in an iterative manner. The largest number of additional primes of this next implication in this current iteration are different from the currently considered essential primes.

Thus, at decision block 412, checks whether the set of essential primes has become equal to the set of primes characterizing the logic function. If yes, then the iterative process stops and the algorithm returns the set of selected implicants plus the set of the essential implicants. These implicants constitute optimized logic function expression for the current round. If no, then the iterative process is repeated until the logic function is fully characterized by the set of essential implicants.

If a logic function is expressed by N primes and M prime implicants, the overall complexity of the search described by FIG. 4 is polynomial, and specifically, $O(M^2N^2)$. The present techniques enable a tractable, implementable algorithm. The correctness of the present techniques follows from the definition of the body of the iterative process and the fact that the algorithm stops when the set of essential primes becomes equal to the set of primes of the logic function.

Below is a code snippet that implements the maximal prime coverage search:

```
void mark_selected_implicants(implicant_list *list, logic_function_
primes *sprimes)
{
    unsigned int essential_primes[PRIME_FLAG_SEGMENTS];
    int i = 0, num = 0;
    int max_index = -1;
    int max_covered = -1;
    int temp_covered = 0, covered = 0;
    int covered_bound = sprimes->num;
    get_essential_primes(list, essential_primes, num);
    covered = num;
    while(covered < covered_bound)
    {
        max_index = -1;
        max_covered = -1;
        for(i = 0; i < list->num; i++)
        {
            if(list->implicants[i].state != PRIME)
                continue;
            new_primes_in_implicant(&(list->implicants[i]), essential_
            primes,
                temp_covered);
            if (temp_covered > max_covered)
            {
                max_covered = temp_covered;
                max_index = i;
            }
        }
        if (max_index >= 0)
        {
            update_primes_taken(&(list->implicants[max_index]),
                essential_primes, num);
            list->implicants[max_index].state = SELECTED;
        }
        covered = num;
    }
    return;
}
```

Figure 5:
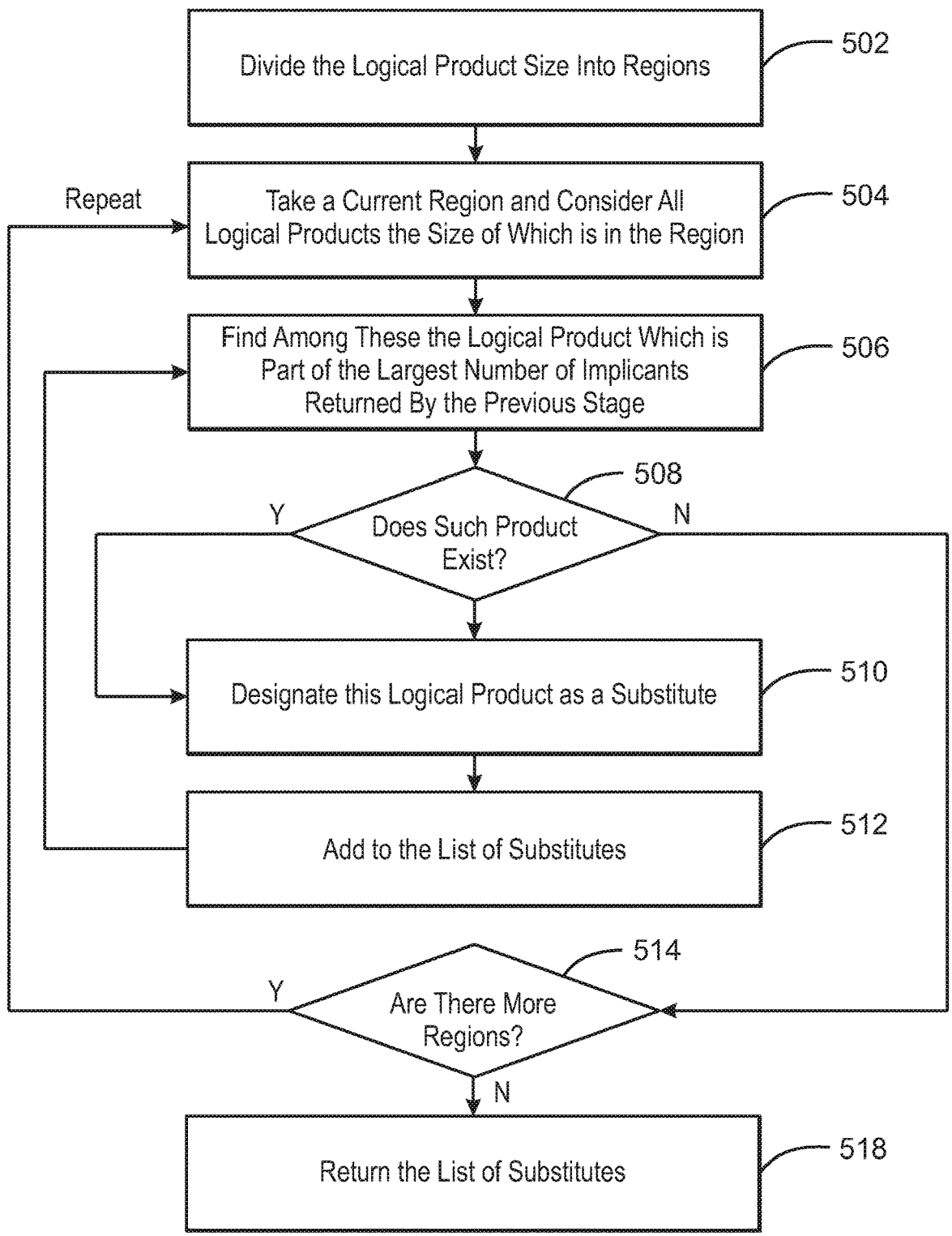
FIG. 5 is a process flow diagram of a method that enables a divide and conquer substitute search.

FIG. 5 is a process flow diagram of a method 500 that enables a divide and conquer substitute search. The divide and conquer substitute search prevents duplications in the computations of logical products. Such duplications may happen as part of the computations of the implicants of the various logic function outputs (i.e., S-box output bits).

At block 502, the logical product (implicant) size is divided into regions. First, the length of logical products is divided into regions, such as logical products of size 5-8 bits, size 3-4 bits, and size 2 bits or less. Thus, the number of bits used to specify the logical product is the size of the logical product. A logical product of size six is specified by 6-bits.

The inputs may be in direct form or inverted. As used herein, a region is defined by logical products within a particular size range. For example, a logical product of size six may be included in a first region with logical products of size five and larger. A second logical region may include logical products of size three, four and five. A third region may include logical products with a size that is less than two. In embodiments, there may be any number of regions. The selection of regions enables management of the complexity of the search.

After logical products are grouped into regions based on size, the divide and conquer substitute search begins an iterative process. At block 504, all logical products that correspond to the current region are selected for consideration. Various representations of the logical products may be considered, such as direct form or inverted. Thus, a current region is obtained, and all logical products that correspond to the particular region are considered in the current iteration. At block 506, the logical products are searched to find the logical product which is part of a largest number of implicants returned at by in the set of essential implicants and selected implicants from the maximal prime coverage search. In this search, each logical product is a product in the finite field GF(2) between input bits of the logic function, where the input bits appear as is, or in the form of their complements. All possible combinations of input bits are considered. These logical combinations are searched to find the one with largest number of occurrences in the implicants that were selected previously. As used herein, when a first logical product is part of a first implicant, the first logical product is a factor of a second logical product where the second logical product is formed from the input bits that are common between the primes which form the first implicant. At block 508, it is determined if the logical product which is part of the largest number of implicants exists. If the logical product which is part of the largest number of implicants exist, process flow continues to block 510. If the logical product which is part of the largest number of implicants does not exist, process flow continues to block 512.

From these logical products, the divide and conquer search determines the logical product which is part of the largest number of implicants returned by the previous stage. If such logical product exists, then the logical product is designated as 'substitute' at block 510 and computed once for all implicants that contain the logical product. The logical product is then added to a list of substitutes at block 512 and the logic functions of the implicants that contain the substitute are modified to include the multiplication with the substitute. Subsequently, process flow returns to block 506 where a search is made for a next logical product which is part of a next largest number of implicants. If such logical product exists then the same process is repeated once more. If such product does not exist, then the algorithm checks whether there are more regions to consider at block 514. The algorithm stops when there are no more regions to consider and returns the final substitute list as well as modified logic functions of all implicants that are impacted by this process (i.e., contain substitutes) at block 518. Each substitute is computed once for all affected implicants. For example, if there N primes at most (256 in the case of the S-box), M implicants and n regions, the complexity of this process is O(nMN). This holds since the number of logical products to consider in each iteration and for each region is bounded by the maximum number of primes.

The present techniques enable ultra-low latency AES encryption with reasonable area cost by employing a maximal prime coverage search algorithm that replaces Petrick's algorithm in the present realization of the Quine McCluskey logic optimization process. Additionally, the present techniques introduce a novel divide-and-conquer substitute search algorithm which further simplifies the AES logic functions. Moreover, the present techniques optimize not only the S-box transformation but also modified S-box transformations that combine S-box with multiplications which are part of MixColumns.

Figure 6:
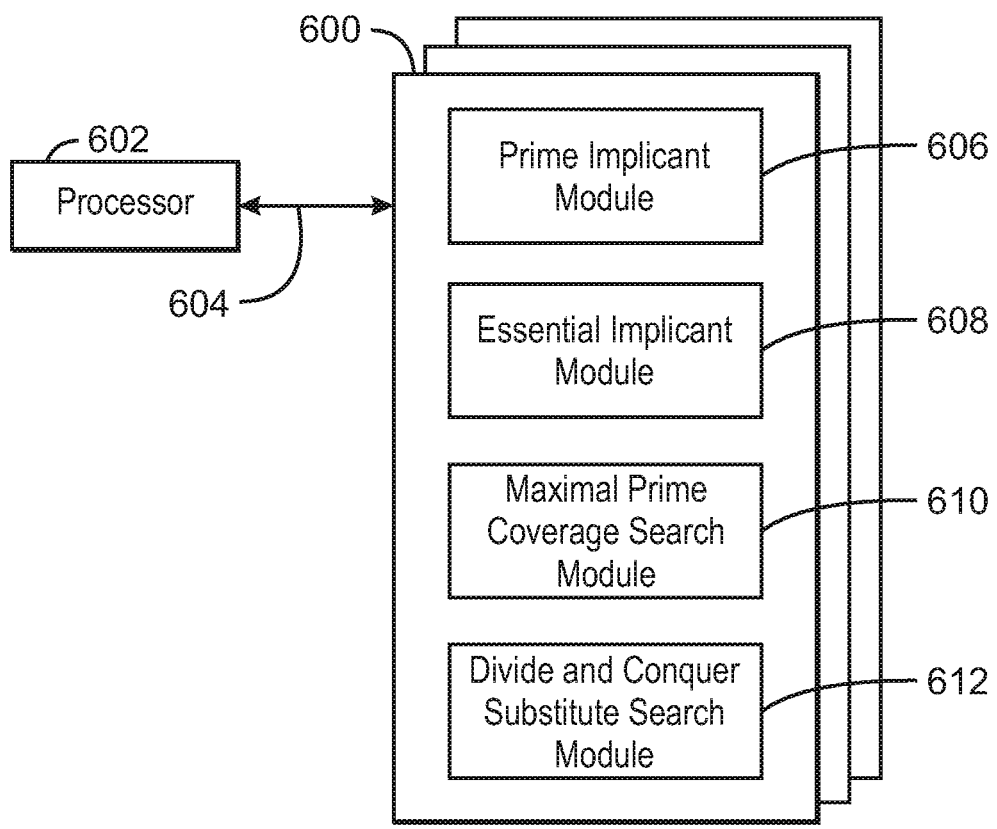
FIG. 6 illustrates a block diagram of a non-transitory computer readable media for ultra-low latency AES.

FIG. 6 illustrates a block diagram of a non-transitory computer readable media for ultra-low latency AES. The tangible, non-transitory, computer-readable medium 600 may be accessed by a processor 602 over a computer interconnect 604. Furthermore, the tangible, non-transitory, computer-readable medium 600 may include code to direct the processor 602 to perform the operations of the current method.

The various software components discussed herein may be stored on the tangible, non-transitory, computer-readable medium 600, as indicated in FIG. 6. For example, a prime implicant module 606 determine the prime implicants of a logic function. The essential implicant module 608 determines the essential implicants \from the prime implicants found previously. At block 610, a maximal prime coverage search module may execute a maximal prime coverage search algorithm. At block 612, a divide and conquer substitute search module may execute a divide and conquer substitute search algorithm.

It is to be understood that any suitable number of the software components shown in FIG. 6 may be included within the tangible, non-transitory computer-readable medium 600. Furthermore, any number of additional software components not shown in FIG. 6 may be included within the tangible, non-transitory, computer-readable medium 600, depending on the specific application.

Figure 7:
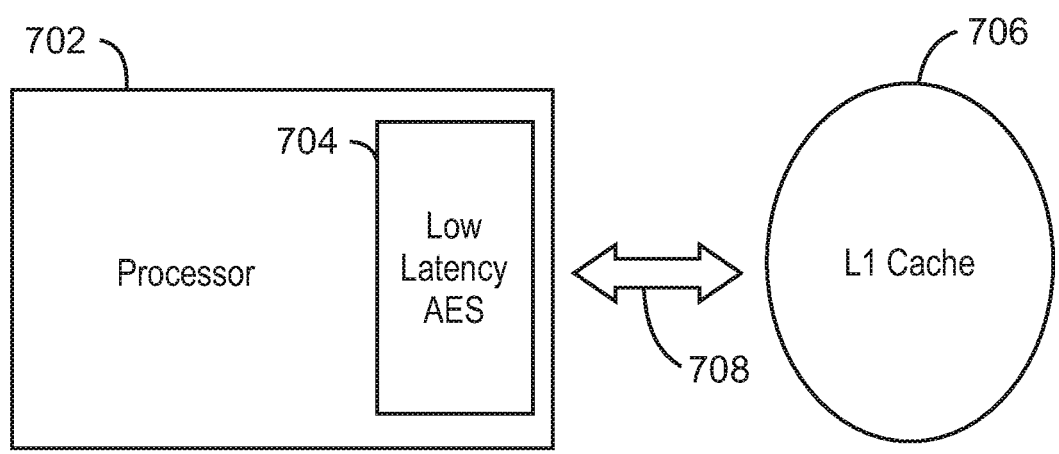
FIG. 7 is first use case of an ultra-low latency AES configuration within a processing core.
Figure 8:
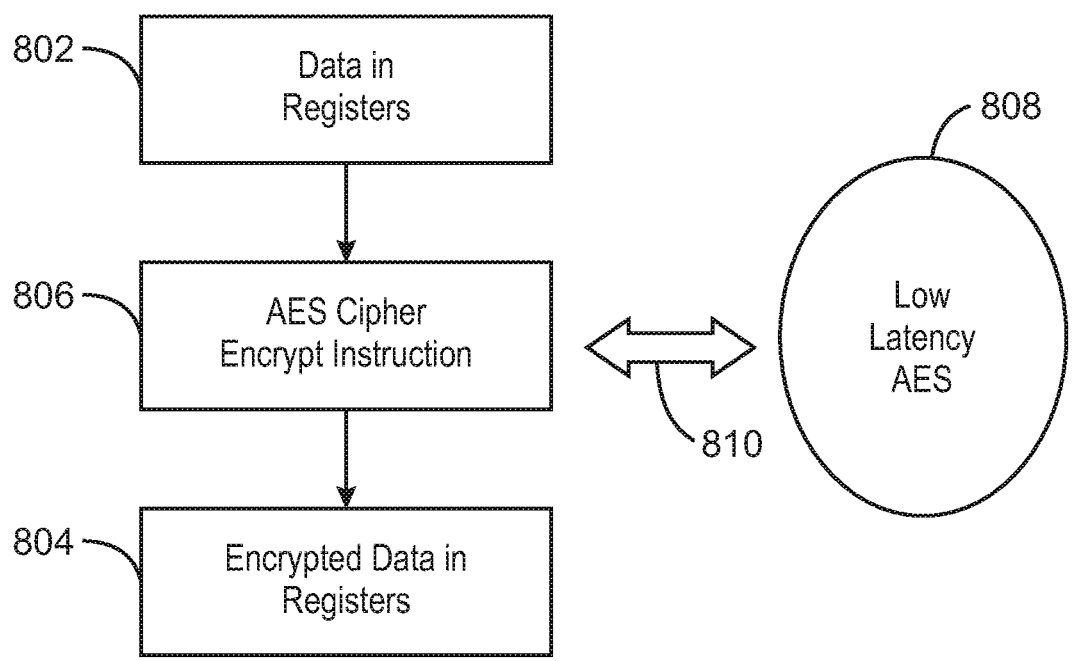
FIG. 8 is a second use case of an ultra-low latency AES configuration.
Figure 9:
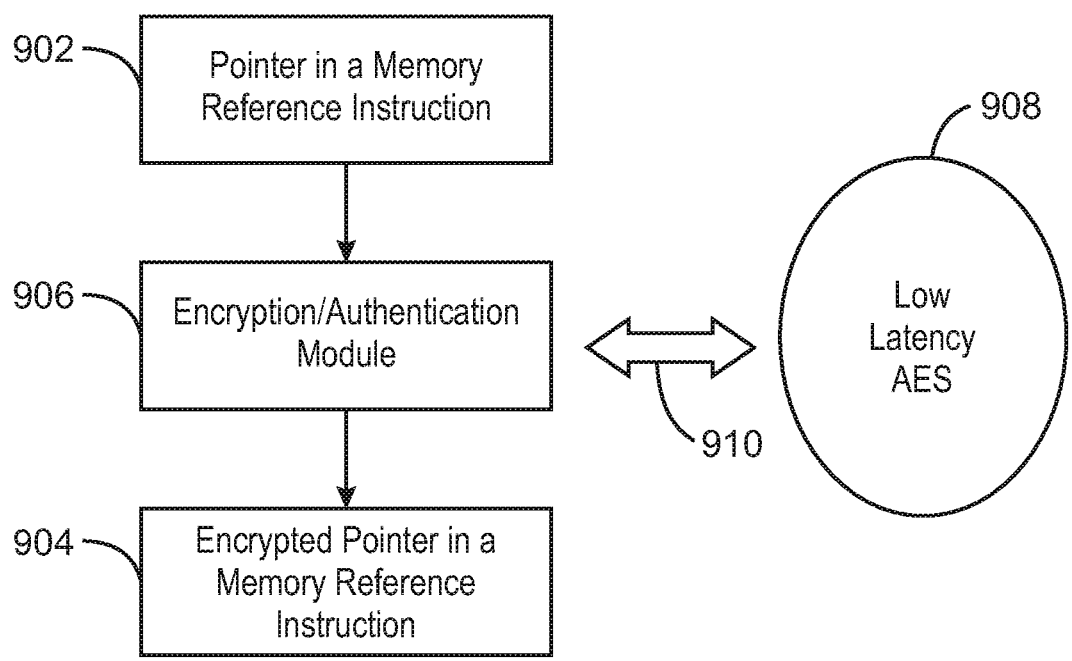
FIG. 9 is a third use case of an ultra-low latency AES configuration.

Examples of AES configurations are illustrated by FIGS. 7-9. FIG. 7 is first use case of an ultra-low latency AES configuration 700 within a processing core 702. In configuration 700, encryption may be performed prior to writing to L1 cache, and decryption can be performed when reading from L1 cache. The ability to execute the AES in 2-3 clocks has profound implications, as illustrated in FIG. 7. Data may flow between the processor core 702 and the memory as indicated by arrow 708. In particular, data flow 708 may include read/write instructions to an L1 cache 706. Data stored in the L1 cache is encrypted according to the present techniques by the ultra-low latency AES block 704. Thus, the present techniques enable the encryption of memory write instructions at the core 702 prior to reaching the L1 cache. Similarly, read instructions may be decrypted as soon as they reach the core, after they are obtained from the L1 cache. In embodiments, latency of AES encryption is comparable to the amount of time taken to access the L1 cache, which is two clocks or clock pulses. Thus, the latency of AES according to the techniques described herein does not have a significant impact on throughput between the processing core and cache. By contrast, traditional AES implementations often require ten or more clocks to complete. This latency renders traditional AES unsuitable for use as illustrated by FIG. 7, as it substantially increases the time to read or write to L1 cache.

The use case illustrated by FIG. 7 is distinguished from the typical encryption that occurs outside of the processing core. In traditional implementations, data is often encrypted at the memory controller, with AES consuming approximately 7 nanoseconds (ns) to complete. The present techniques enable encryption throughout all cache levels. Moreover, the present techniques can be executed by a memory controller. Such an implementation reduces the time for AES completion from 7 ns to 1.5 ns. In embodiments, the traditional AES instructions remain the same. However, the reduction in latency is a result of the S-box logic and circuitry according to the present techniques.

FIG. 8 is a second use case of an ultra-low latency AES configuration 800. As described above, the present techniques enable modification of the S-box to optimize each round of AES. The iterative AES rounds used encrypt/decrypt data is considered an AES block. The reduced latency described herein characterizes the latency of the entire AES block. Thus, the reduction in latency that occurs at the S-box scales to the round level, which further scales to the AES block level. The completion in two clocks is that of the entire block. The nine levels at the S-box levels translates to ninety levels for the entire AES block, which is approximately two clocks. Thus, the entire AES block according to the present techniques is as fast as traditional AES round implementations.

In FIG. 8, data in registers 802 is encrypted by an AES cipher encrypt instruction 806. The AES cipher encrypt instruction 806 is to encrypt data in registers using one instruction. In embodiments, the AES cipher encrypt instruction 806 may be implemented as alternative to the Advanced Encryption Standard New Instructions (AES-NI). The AES-NI instruction set includes instructions to (1) Perform one round of an AES encryption flow; (2) Perform the last round of an AES encryption flow; (3) Perform one round of an AES decryption flow; (4) Perform the last round of an AES decryption flow; (5) Assist in AES round key generation; (6) Assist in AES Inverse Mix Columns; and (7) Carryless multiply. These instructions can be realized using the S-box logic as described in FIGS. 1-5. In embodiments, similar AES encrypt instructions may be executed to encrypt or wrap encryption keys.

FIG. 9 is a third use case of an ultra-low latency AES configuration 900. AES instructions may encrypt memory pointers 902 via the ultra-low latency AES as described by FIGS. 1-5. Thus, the location of data within a memory reference instruction can be encrypted/decrypted. In particular, the operand of a memory access instruction that indicates the location of data can be encrypted according to the present techniques. Such operands are typically stored in registers. An encryption authentication module 906 may enable encryption of the pointer according to instructions based on low latency AES as described herein. The low latency AES block 908 may enable support of encryption/authentication instructions with a reduction in S-box levels as described above.

At block 904, the encryption/authentication module 906 outputs the encrypted pointer in a memory reference instruction. Additionally, another instruction may take an encrypted pointer, such as an offset, and decrypt the pointer. The pointer/offset may be added to an address to locate the data, and the data is then accessed via the offset. The AES block 908 can be executed within the same timescales that are typically used for memory access. Put another way, the present techniques enable encryption/decryption to learn where the data is located, without adding a large amount of time to access the data.

Figure 10:
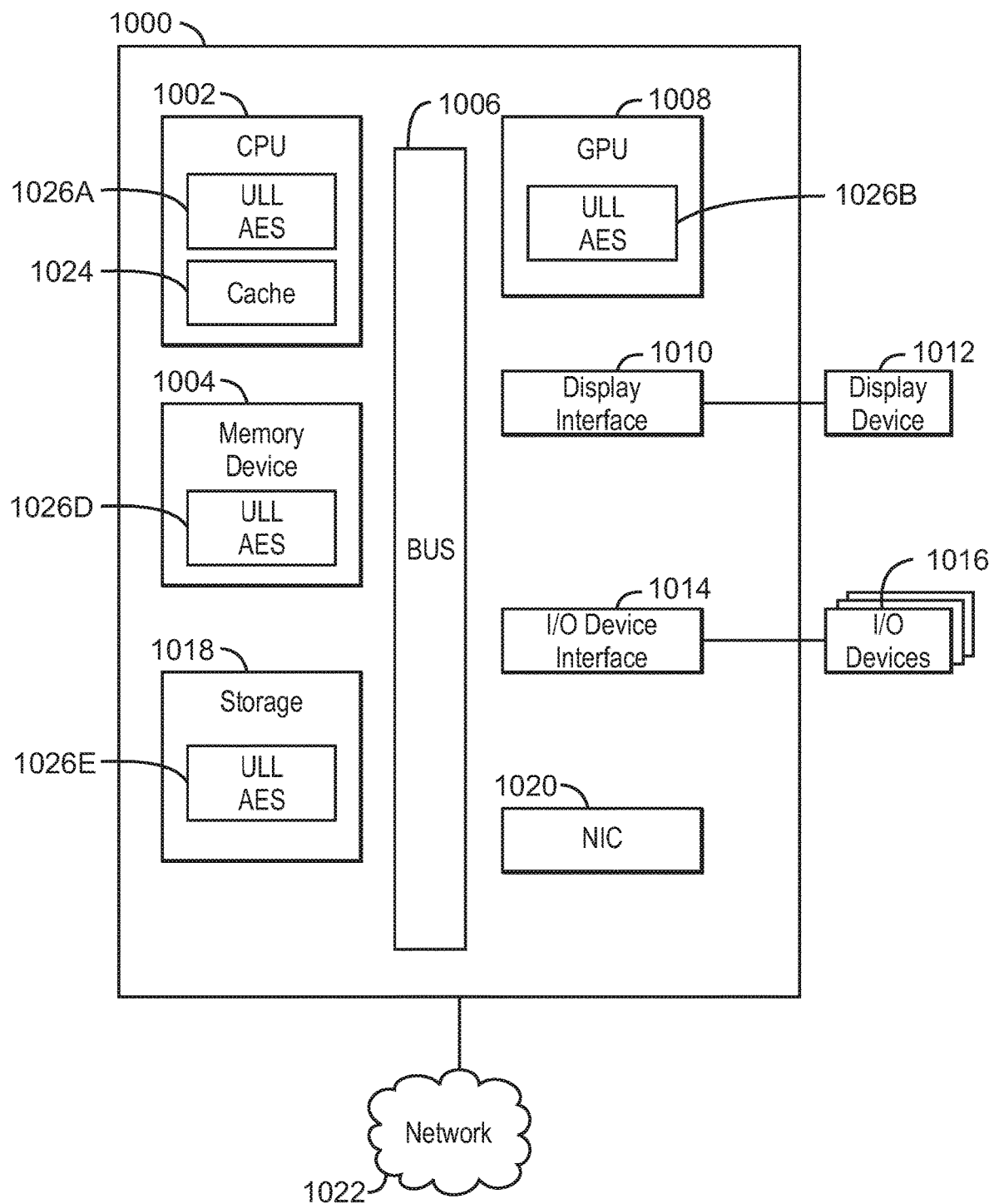
FIG. 10 a block diagram of an example of a host computing device that enable ultra-low latency AES.

FIG. 10 a block diagram of an example of a host computing device that enable ultra-low latency AES. Generally, the ultra-low latency AES implementation as described herein enables faster AES cipher encryption and AES key wrapping instructions when compared to traditional AES implementations, such as AES-NI. The host computing device 1000 may be, for example, a mobile phone, laptop computer, desktop computer, or tablet computer, among others. The host computing device 1000 may include a central processing unit (CPU) or processor 1002 that is adapted to execute stored instructions, as well as a memory device 1004 that stores instructions that are executable by the processor 1002. The processor 1002 can be a single core processor, a multi-core processor, a computing cluster, or any number of other configurations. In some examples, the processor 1002 may be a system-on-chip (SoC) with a multi-core processor architecture. The processor 1002 may include ultra-low latency (ULL) AES hardware 1026A to enable AES encryption and decryption operations. AES function 1026A may be located on the die of processor 1002. The processor 1002 may also include a cache 1024. Similar to FIG. 7, read/write instructions may enable encryption of data that flows between the processor 1002 and the cache 1024.

The memory device 1004 can include random access memory, read only memory, or any other suitable memory systems. For example, the memory device 1004 may include dynamic random-access memory (DRAM). The memory device 1004 can include random access memory (RAM), read only memory (ROM), flash memory, or any other suitable memory systems. The memory device 1004 may include ULL AES hardware 1026D to enable AES encryption and decryption operations local to the memory device. AES function 1026D may be located within a memory controller or a memory engine of the memory device 1026D.

The computing device 1000 may also include a graphics processing unit (GPU) 1008. As shown, the CPU 1002 may be coupled through the bus 1006 to the GPU 1008. The GPU 1008 may be configured to perform any number of graphics operations within the computing device 1000. For example, the GPU 1008 may be configured to render or manipulate graphics images, graphics frames, videos, or the like, to be displayed to a user of the computing device 1000. The GPU 1008 may include ULL AES hardware 1026B to enable AES encryption and decryption operations local to the GPU.

The processor 1002 may also be linked through the system interconnect 1006 (e.g., PCI®, PCI-Express®, NuBus, etc.) to a display interface 1010 adapted to connect the host computing device 1000 to a display device 1012. The display device 1012 may include a display screen that is a built-in component of the host computing device 1000. The display device 1012 may also include a computer monitor, television, or projector, among others, that is externally connected to the host computing device 1000. The display device 1012 can include light emitting diodes (LEDs), and micro-LEDs, among others.

The processor 1002 may be connected through a system interconnect 1006 to an input/output (I/O) device interface 1014 adapted to connect the computing host device 1000 to one or more I/O devices 1016. The I/O devices 1016 may include, for example, a keyboard and a pointing device, wherein the pointing device may include a touchpad or a touchscreen, among others. The I/O devices 1016 may be built-in components of the host computing device 1000, or may be devices that are externally connected to the host computing device 1000.

The computing device 1000 also includes a storage device 1018. The storage device 1018 is a physical memory such as a hard drive, an optical drive, a thumbdrive, an array of drives, a solid-state drive, or any combinations thereof. The storage device 1018 may also include remote storage drives. The storage device 1018 may include ULL AES hardware 1026E to enable AES encryption and decryption operations local to the storage device 1018. The AES hardware 1026E may be located within a storage controller or a storage engine of the memory device 1026E.

In addition, a network interface controller (also referred to herein as a NIC) 1002 may be adapted to connect the host computing device 1000 through the system interconnect 1006 to a network 1022. The network 1022 may be a cellular network, a radio network, a wide area network (WAN), a local area network (LAN), or the Internet, among others.

It is to be understood that the block diagram of FIG. 10 is not intended to indicate that the host computing device 1000 is to include all of the components shown in FIG. 10. Rather, the host computing device 1000 can include fewer or additional components not illustrated in FIG. 10 (e.g., additional memory components, embedded controllers, additional modules, additional network interfaces, memory controllers, etc.). Furthermore, any of the functionalities of the ULL AES 1026A, 1026B, 1026D, and 1026E may be partially, or entirely, implemented in hardware and/or in the processor 1002. For example, the functionality may be implemented with an application specific integrated circuit, logic implemented in an embedded controller, or in logic implemented in the processor 1002, among others.

Exemplary logic below illustrates an S-box logic function combined with a multiplicative factor of 2 (hexadecimal). The exemplary logic may correspond to logic function 128B in FIG. 1. Moreover, the exemplary logic demonstrates the calculation of substitution bits, in accordance with the method 500 of FIG. 5. Accordingly, the example below includes the substitute bits and optimized logic functions using the output bits of SBox X 0x02. One hundred and thirty-five logic product substitutes S0-S134 are listed below. The logic function includes eight bits of input data, $i_0, i_1, i_2, i_3, i_4, i_5, i_6, i_7$, with seven hundred sixty-two logic product substitution operations. For each single bit logic product substitute, the cardinality of implicants in the set of implicants that use the corresponding substitute is given. In the example below, the divide and conquer approach described above yields substitute bits found in regions of various sizes based on the number of input bits used to derive the associated substitute bit. Further, the number of gates used to compute the single bit logic product substitute is given.

Thus, in order to generate the logic used to realize an optimized S-box, there are one hundred and thirty-five logic product substitutes that are calculated a single time. These values are single bit values that are re-used as substitute implicants during the computation of the S-box output. Each single bit value may be re-used to represent an implicant more than once. The seven hundred sixty-two logic product substitution operations indicate that there are seven hundred sixty-two cases where an implicant is represented by a logic product substitute in the optimized computation of S-box results.

For example, the substitute bit S0 can be calculated by combining (via AND) inverted bit $i_0$, inverted bit $i_1$, inverted bit $i_4$, and bit $i_7$. The cardinality indicates that the substitute bit S0 is reused in fifteen cases, to replace fifteen implicants within the optimized S-box. Moreover, S0 uses three AND gates in the computation to derive the substitute bit S0. Additional gates, such as an inverter, may be used to obtain the mixed complement form of each bit when needed. However, the use of inverters is typically considered negligible.

Optimized logic with substitutions...
computing substitutes
................................................................
................................................................
there are 135 logic product substitutes
there can be 762 logic product substitution operations

```
S0  := (~i0) * (~i1) * (~i4) * (i7)      (cardinality = 15, AND gates = 3)
S1  := (~i0) * (~i1) * (i2)  * (~i7)     (cardinality = 14, AND gates = 3)
S2  := (i1)  * (~i2) * (i3)  * (~i7)     (cardinality = 14, AND gates = 3)
S3  := (i3)  * (i4)  * (i5)  * (~i7)     (cardinality = 14, AND gates = 3)
S4  := (~i0) * (i1)  * (i2)  * (i4)      (cardinality = 13, AND gates = 3)
S5  := (i0)  * (i1)  * (~i3) * (~i6)     (cardinality = 13, AND gates = 3)
S6  := (i0)  * (~i4) * (~i5) * (i6)      (cardinality = 13, AND gates = 3)
S7  := (~i0) * (i1)  * (~i3) * (~i4)     (cardinality = 12, AND gates = 3)
S8  := (~i0) * (~i2) * (i4)  * (~i6)     (cardinality = 12, AND gates = 3)
S9  := (i0)  * (~i1) * (~i2) * (~i5)     (cardinality = 11, AND gates = 3)
S10 := (i0)  * (~i1) * (i2)  * (~i7)     (cardinality = 11, AND gates = 3)
S11 := (~i0) * (~i5) * (i6)  * (i7)      (cardinality = 11, AND gates = 3)
S12 := (~i2) * (i3)  * (~i4) * (i5)      (cardinality = 11, AND gates = 3)
S13 := (i0)  * (~i3) * (i4)  * (i5)      (cardinality = 10, AND gates = 3)
S14 := (i1)  * (i3)  * (~i5) * (i7)      (cardinality = 10, AND gates = 3)
S15 := (i2)  * (i3)  * (~i4) * (~i6)     (cardinality = 10, AND gates = 3)
S16 := (~i1) * (i2)  * (i3)  * (i4)      (cardinality = 9, AND gates = 3)
S17 := (~i2) * (~i3) * (~i4) * (i5)      (cardinality = 9, AND gates = 3)
S18 := (~i3) * (~i5) * (~i6) * (~i7)     (cardinality = 9, AND gates = 3)
S19 := (~i0) * (~i1) * (i5)  * (i6)      (cardinality = 8, AND gates = 3)
S20 := (~i0) * (i1)  * (i5)  * (i7)      (cardinality = 8, AND gates = 3)
S21 := (i0)  * (i1)  * (i3)  * (~i6)     (cardinality = 7, AND gates = 3)
S22 := (i0)  * (~i1) * (i4)  * (i6)      (cardinality = 7, AND gates = 3)
S23 := (i0)  * (~i2) * (~i4) * (~i7)     (cardinality = 7, AND gates = 3)
S24 := (i0)  * (i2)  * (~i4) * (i7)      (cardinality = 7, AND gates = 3)
S25 := (~i0) * (i3)  * (~i4) * (~i7)     (cardinality = 7, AND gates = 3)
S26 := (i1)  * (i2)  * (i5)  * (~i7)     (cardinality = 7, AND gates = 3)
S27 := (~i1) * (i3)  * (~i6) * (i7)      (cardinality = 7, AND gates = 3)
S28 := (i0)  * (i1)  * (i4)  * (~i5)     (cardinality = 6, AND gates = 3)
S29 := (i0)  * (i4)  * (~i6) * (~i7)     (cardinality = 6, AND gates = 3)
S30 := (~i2) * (i4)  * (i5)  * (i7)      (cardinality = 6, AND gates = 3)
S31 := (~i1) * (i2)  * (~i3) * (~i5)     (cardinality = 5, AND gates = 3)
S32 := (~i1) * (~i2) * (~i3) * (i6)      (cardinality = 5, AND gates = 3)
S33 := (i1)  * (~i2) * (~i4) * (~i5)     (cardinality = 5, AND gates = 3)
S34 := (i0)  * (i1)  * (i2)  * (i6)      (cardinality = 4, AND gates = 3)
S35 := (i0)  * (~i1) * (i3)  * (i5)      (cardinality = 4, AND gates = 3)
S36 := (~i0) * (~i2) * (i3)  * (i4)      (cardinality = 4, AND gates = 3)
S37 := (~i0) * (~i2) * (~i6) * (i7)      (cardinality = 4, AND gates = 3)
S38 := (i1)  * (i2)  * (~i3) * (~i6)     (cardinality = 4, AND gates = 3)
S39 := (~i1) * (~i2) * (~i5) * (~i7)     (cardinality = 4, AND gates = 3)
S40 := (~i1) * (~i3) * (i4)  * (i5)      (cardinality = 4, AND gates = 3)
S41 := (i2)  * (i3)  * (i4)  * (i6)      (cardinality = 4, AND gates = 3)
S42 := (~i0) * (i1)  * (i2)  * (~i7)     (cardinality = 3, AND gates = 3)
S43 := (i0)  * (~i1) * (i5)  * (i7)      (cardinality = 3, AND gates = 3)
S44 := (~i0) * (i2)  * (~i4) * (~i5)     (cardinality = 3, AND gates = 3)
S45 := (i0)  * (i2)  * (i5)  * (~i6)     (cardinality = 3, AND gates = 3)
S46 := (i0)  * (~i3) * (i4)  * (~i7)     (cardinality = 3, AND gates = 3)
S47 := (~i0) * (~i4) * (~i6) * (~i7)     (cardinality = 3, AND gates = 3)
S48 := (i0)  * (i5)  * (i6)  * (~i7)     (cardinality = 3, AND gates = 3)
S49 := (i1)  * (~i2) * (i5)  * (~i6)     (cardinality = 3, AND gates = 3)
S50 := (~i1) * (~i3) * (~i4) * (~i6)     (cardinality = 3, AND gates = 3)
S51 := (i2)  * (~i4) * (i6)  * (i7)      (cardinality = 3, AND gates = 3)
S52 := (~i0) * (i1)  * (~i3) * (i4) * (i7)  (cardinality = 2, AND gates = 4)
S53 := (~i0) * (i1)  * (i3)  * (i5)      (cardinality = 2, AND gates = 3)
S54 := (i0)  * (~i3) * (i6)  * (i7)      (cardinality = 2, AND gates = 3)
S55 := (~i0) * (i4)  * (i6)  * (~i7)     (cardinality = 2, AND gates = 3)
S56 := (i1)  * (~i2) * (i3)  * (i6)      (cardinality = 2, AND gates = 3)
S57 := (~i2) * (i3)  * (~i4) * (~i5)     (cardinality = 2, AND gates = 3)
S58 := (~i2) * (~i3) * (~i5) * (i6)      (cardinality = 2, AND gates = 3)
S59 := (~i4) * (i5)  * (~i6) * (i7)      (cardinality = 2, AND gates = 3)
S60 := (~i3) * (~i6)                      (cardinality = 15, AND gates = 1)
S61 := (~i5) * (i6)                       (cardinality = 15, AND gates = 1)
S62 := (i6)  * (i7)                       (cardinality = 13, AND gates = 1)
S63 := (i4)  * (~i6)                      (cardinality = 12, AND gates = 1)
S64 := (~i3) * (i5)                       (cardinality = 11, AND gates = 1)
S65 := (~i5) * (i7)                       (cardinality = 11, AND gates = 1)
S66 := (i2)  * (~i5)                      (cardinality = 10, AND gates = 1)
S67 := (~i3) * (~i7)                      (cardinality = 10, AND gates = 1)
S68 := (~i1) * (i7)                       (cardinality = 9, AND gates = 1)
S69 := (~i2) * (i5)                       (cardinality = 9, AND gates = 1)
S70 := (~i2) * (i6)                       (cardinality = 9, AND gates = 1)
S71 := (i3)  * (~i4)                      (cardinality = 9, AND gates = 1)
S72 := (i0)  * (i1)                       (cardinality = 7, AND gates = 1)
S73 := (~i0) * (~i6)                      (cardinality = 7, AND gates = 1)
S74 := (i2)  * (i6)                       (cardinality = 7, AND gates = 1)
```

-continued

| | |
|---|---|
| S75 := (i3) * (~i6) | (cardinality = 7, AND gates = 1) |
| S76 := (~i5) * (~i7) | (cardinality = 7, AND gates = 1) |
| S77 := (~i1) * (~i5) | (cardinality = 6, AND gates = 1) |
| S78 := (i2) * (~i3) | (cardinality = 6, AND gates = 1) |
| S79 := (~i2) * (i4) | (cardinality = 6, AND gates = 1) |
| S80 := (i2) * (~i7) | (cardinality = 6, AND gates = 1) |
| S81 := (~i4) * (i6) | (cardinality = 6, AND gates = 1) |
| S82 := (i4) * (i6) | (cardinality = 6, AND gates = 1) |
| S83 := (i0) * (~i6) | (cardinality = 5, AND gates = 1) |
| S84 := (~i0) * (i6) | (cardinality = 5, AND gates = 1) |
| S85 := (i1) * (i3) | (cardinality = 5, AND gates = 1) |
| S86 := (~i1) * (i5) | (cardinality = 5, AND gates = 1) |
| S87 := (~i4) * (~i5) | (cardinality = 5, AND gates = 1) |
| S88 := (~i4) * (i5) | (cardinality = 5, AND gates = 1) |
| S89 := (i4) * (~i7) | (cardinality = 5, AND gates = 1) |
| S90 := (i0) * (~i4) | (cardinality = 4, AND gates = 1) |
| S91 := (~i1) * (i2) | (cardinality = 4, AND gates = 1) |
| S92 := (i1) * (~i3) | (cardinality = 4, AND gates = 1) |
| S93 := (i1) * (~i5) | (cardinality = 4, AND gates = 1) |
| S94 := (i1) * (i5) | (cardinality = 4, AND gates = 1) |
| S95 := (i1) * (~i7) | (cardinality = 4, AND gates = 1) |
| S96 := (~i2) * (~i3) | (cardinality = 4, AND gates = 1) |
| S97 := (~i3) * (~i5) | (cardinality = 4, AND gates = 1) |
| S98 := (i3) * (i6) | (cardinality = 4, AND gates = 1) |
| S99 := (i3) * (i7) | (cardinality = 4, AND gates = 1) |
| S100 := (~i4) * (~i6) | (cardinality = 4, AND gates = 1) |
| S101 := (~i5) * (~i6) | (cardinality = 4, AND gates = 1) |
| S102 := (i5) * (~i6) | (cardinality = 4, AND gates = 1) |
| S103 := (~i0) * (~i4) | (cardinality = 3, AND gates = 1) |
| S104 := (i1) * (~i2) | (cardinality = 3, AND gates = 1) |
| S105 := (~i1) * (i3) | (cardinality = 3, AND gates = 1) |
| S106 := (i1) * (i7) | (cardinality = 3, AND gates = 1) |
| S107 := (i2) * (i4) | (cardinality = 3, AND gates = 1) |
| S108 := (~i2) * (~i6) | (cardinality = 3, AND gates = 1) |
| S109 := (i3) * (i6) | (cardinality = 3, AND gates = 1) |
| S110 := (i4) * (~i5) | (cardinality = 3, AND gates = 1) |
| S111 := (i5) * (i6) | (cardinality = 3, AND gates = 1) |
| S112 := (i5) * (i7) | (cardinality = 3, AND gates = 1) |
| S113 := (i0) * (~i2) | (cardinality = 2, AND gates = 1) |
| S114 := (i0) * (i2) | (cardinality = 2, AND gates = 1) |
| S115 := (~i0) * (~i3) | (cardinality = 2, AND gates = 1) |
| S116 := (~i0) * (i3) | (cardinality = 2, AND gates = 1) |
| S117 := (i0) * (~i7) | (cardinality = 2, AND gates = 1) |
| S118 := (~i1) * (i4) | (cardinality = 2, AND gates = 1) |
| S119 := (~i1) * (~i6) | (cardinality = 2, AND gates = 1) |
| S120 := (i1) * (~i6) | (cardinality = 2, AND gates = 1) |
| S121 := (~i1) * (i6) | (cardinality = 2, AND gates = 1) |
| S122 := (i2) * (i3) | (cardinality = 2, AND gates = 1) |
| S123 := (~i2) * (~i4) | (cardinality = 2, AND gates = 1) |
| S124 := (~i2) * (~i5) | (cardinality = 2, AND gates = 1) |
| S125 := (i2) * (~i6) | (cardinality = 2, AND gates = 1) |
| S126 := (~i2) * (~i7) | (cardinality = 2, AND gates = 1) |
| S127 := (i3) * (i4) | (cardinality = 2, AND gates = 1) |
| S128 := (i3) * (~i5) | (cardinality = 2, AND gates = 1) |
| S129 := (i3) * (~i7) | (cardinality = 2, AND gates = 1) |
| S130 := (~i4) * (~i7) | (cardinality = 2, AND gates = 1) |
| S131 := (i5) * (~i7) | (cardinality = 2, AND gates = 1) |
| S132 := (~i6) * (~i7) | (cardinality = 2, AND gates = 1) |
| S133 := (i6) * (~i7) | (cardinality = 2, AND gates = 1) |
| S134 := (~i6) * (i7) | (cardinality = 2, AND gates = 1) |

The output logic below for input bits $i_0$, $i_1$, $i_2$, $i_3$, $i_4$, $i_5$, $i_6$, $i_7$, are derived via the input bits and the substitute bits. A logical OR is indicated by (+), while a logical and is indicated by (*). Additionally, the complement is indicated (~). The optimized expressions include input bits and substitute bits. Each logical product that is found in the expression of the S-box output bits is essentially an implicant. The nine levels described herein to express the S-box are a direct result of the levels used to achieve the logical OR operations and any preceeding logical AND operations in each logic function below. The number terms that are combined to produce each logic function does not exceed sixty-four.

Correctness verified (using substitutions)

optimized logic (using substitutions) for bit 0

(~i0) * S15 * S76 + (~i5) * S10 * S71 + (i3) * S1 * S63 + (~i4) * S26 * S60 + (~i4) * S2 * S61 + (~i0) * S2 * S61 + (~i3) * S4 * S61 +
(~i0) * S3 * S70 + (~i2) * S5 * S65 + (~i3) * S24 * S77 + (i7) * S9 * S75 + (i4) * S38 * S65 + (~i0) * S16 * S65 + (i3) * S6 * S68 + S52 * S70 + (i0) * S14 * S82 + (i7) * S16 * S61 + (i5) * S7 * S62 + (i1) * S12 * S62 + (i2) * S19 * S99 + S1 * S101 + S5 * S80 + S8 * S76 + S9 * S89 + S9 * S63 + S28 * S125 + S5 * S107 + S29 * S128 + S8 * S85 + S28 * S122 + (~i0) * (~i7) * S17 + S23 * S86 + S35 * S100 + S2 * S102 + S49 * S127 + (i3) * (i5) * S4 + S32 * S117 + S46 * S70 + S22 * S67 + S17 * S133 + S26 * S98 + S22 * S131 + S22 * S69 + S40 * S74 + S59 * S116 + S51 * S93 + S43 * S109 + (~i7) * S13 + (~i4) * S34 + (~i2) * S0 + (i7) * S40 optimized logic (using substitutions) for bit 1

(~i7) * S9 * S71 + (~i6) * S1 * S71 + (i3) * S9 * S63 + (~i4) * S10 * S64 + (~i0) * S32 * S87 + (i1) * S25 * S61 + (~i2) * S7 * S65 +
(i2) * S0 * S60 + (~i2) * S0 * S75 + (i0) * S15 * S65 + (i4) * S9 * S99 + (i5) * S0 * S60 + (i2) * S0 * S64 +
(i7) * S12 * S73 + (i7) * S13 * S108 + (i7) * S6 * S78 + (i0) * S14 * S74 + (i7) * S22 * S78 + (i0) * S17 * S62 +
(i3) * S51 * S86 + S18 * S103 + S39 * S115 + S33 * S132 + S5 * S124 + S18 * S91 +
S1 * S101 + S1 * S87 + S18 * S118 + S46 * S66 + S38 * S89 + S53 * S125 + S8 * S94 + (~i0) * (~i2) * S3 + S3 * S120 + (i1) * (i2) * S6 + S2 * S82 + S19 * S67 +
S19 * S126 + S7 * S111 + S48 * S85 + S19 * S79 + S3 * S70 + S60 * S65 * S104 +
S5 * S65 + S14 * S90 + S15 * S106 + S4 * S65 + (~i0) * (i7) * S16 + S30 * S72 +
S51 * S92 + S11 * S105 + (i2) * S29 + (i1) * S36 + (~i7) * S45 optimized logic (using substitutions) for bit 2

S0 * S58 + (~i1) * S18 * S79 + (i4) * S39 * S115 + (i0) * S2 * S63 +
(i1) * S36 * S61 + (~i0) * S16 * S61 + (i6) * S1 * S64 +
(i5) * S7 * S74 + (i1) * S12 * S84 + (i7) * S8 * S64 + (i4) * S20 * S60 + (i3) * S30 * S72 + (i2) * S11 * S71 +
(i3) * S0 * S74 + (~i3) * S4 * S62 + (i2) * S40 * S62 + S33 * S73 + S23 * S93 * S31 * S130 +
(~i0) * (i2) * S18 + S10 * S87 + S50 * S114 + S2 * S101 + S15 * S76 + S4 * S75 +
S49 * S67 + S17 * S95 + S13 * S132 + S3 * S119 + (i0) * (~i1) * S3 + S35 * S63 +
S6 * S126 + S6 * S104 + S42 * S81 + S39 * S98 + S2 * S81 + S2 * S84 + S28 * S74 + S48 * S96 + S41 * S94 + S37 * S92 + S31 * S134 + S24 * S97 + S27 * S113 + S14 * S114 + S27 * S110 + S59 * S113 + S12 * S68 + S34 * S99 +
S54 * S110 + (~i3) * S47 optimized logic (using substitutions) for bit 3

S1 * S64 * S82 + (~i4) * S1 * S60 + (i1) * S25 * S66 + (~i1) * S8 * S67 + (~i5) * S4 * S67 + (~i1) * S6 * S67 + (i2) * S6 * S67 +
(i3) * S10 * S61 + (~i6) * S0 * S66 + (i0) * S27 * S66 + (i3) * S8 * S65 + (i0) * S14 * S63 + (i5) * S24 * S60 +
(~i3) * S0 * S61 + (~i3) * S28 * S62 + S9 * S60 + S47 * S93 + S21 * S80 + (~i0) * (i4) * S18 +
S8 * S93 + S5 * S89 + S17 * S95 + S49 * S117 + S10 * S88 + (~i0) * (~i1) * S12 +
S45 * S129 + (i0) * (i3) * S26 + S26 * S63 + S3 * S73 + S7 * S70 + S56 * S90 +
S22 * S96 + S22 * S128 + S17 * S84 + S12 * S121 + S53 * S82 + S0 * S69 + S27 * S69 + (~i0) * (i5) * S27 + S30 * S92 + S11 * S123 + S33 * S62 + S14 * S81 +
S11 * S85 + S43 * S81 + S41 * S112 + (i7) * S38 + (~i2) * S14 + (i0) * S30

-continued

Correctness verified (using substitutions)

optimized logic (using substitutions) for bit 4

(~i6) * S7 * S80 + (~i0) * S2 * S63 + (~i7) * S12 * S83 + (i4) * S5 * S69 + (~i6) * S40 * S80 + (i4) * S1 * S64 + (i1) * S3 * S73 +
(~i7) * S32 * S103 + (i0) * S2 * S61 + (i3) * S55 * S77 + (~i7) * S22 * S69 + (i2) * S14 * S73 + (i7) * S4 * S60 +
(i7) * S5 * S88 + (i0) * S12 * S68 + (i2) * S20 * S71 + (i2) * S13 * S68 + (i3) * S20 * S79 + (~i0) * S16 * S62 +
(i6) * S20 * S71 + (i6) * S30 * S72 + S10 * S60 + S2 * S90 + S29 * S96 + S29 * S77 +
S29 * S66 + (i0) * (~i5) * S16 + S17 * S73 + S2 * S102 + S6 * S104 + S44 * S121 +
S10 * S81 + S4 * S61 + S26 * S82 + S57 * S134 + (~i5) * S52 + S0 * S102 +
S0 * S64 + S37 * S86 + S45 * S99 + S11 * S78 + S13 * S62 +
(i0) * S18 + (~i3) * S9 + (~i4) * S31 + (~i1) * S66 * S83 + (~i7) * S6 + (~i4) * S61 * S95 + (~i3) * S34 optimized logic (using substitutions) for bit 5

(~i2) * S18 * S90 + (~i2) * S25 * S77 + (~i5) * S5 * S79 + (~i2) * S29 *
S105 + (~i1) * S17 * S83 + (~i7) * S21 * S88 + (~i6) * S13 * S91 +
(~i2) * S19 * S67 + (i7) * S31 * S100 + (~i3) * S4 * S65 + (i7) * S8 * S85 + (~i6) * S16 * S65 + (~i2) * S20 * S60 +
(i7) * S7 * S69 + (~i3) * S0 * S61 + (~i3) * S11 * S79 + (~i1) * S12 * S62 + S7 * S108 + S1 * S101 +
S1 * S60 + S25 * S119 + S4 * S129 + S50 * S131 + S26 * S103 + S71 * S80 * S86 +
S15 * S86 + (i0) * (i4) * S26 + (i1) * (i6) * S23 + S44 * S109 + S42 * S109 + S57 * S133 +
S32 * S110 + S19 * S107 + S3 * S84 + S24 * S120 + S14 * S100 + S14 * S83 +
S24 * S105 + S24 * S94 + S9 * S62 + S41 * S106 + S54 * S88 + (i0) * S15 +
(i2) * S46 + (~i5) * S56 + (i6) * S35 + (i7) * S35 optimized logic (using substitutions) for bit 6

(~i2) * S7 * S76 + (~i0) * S15 * S77 + (i4) * S5 * S76 + (i4) * S1 * S97 + (i3) * S10 * S63 + (i5) * S7 * S80 + (i1) * S8 * S64 +
(~i6) * S3 * S72 + (i0) * S3 * S91 + (~i7) * S7 * S70 + (i2) * S6 * S67 + (~i3) * S10 * S61 + (i6) * S4 * S67 +
(~i7) * S4 * S111 + (i1) * S13 * S74 + (~i1) * S3 * S70 + (i7) * S9 * S75 + (~i3) * S8 * S68 + (i7) * S31 * S63 +
(i4) * S5 * S112 + (i7) * S19 * S78 + (~i1) * S13 * S62 + (i7) * S19 * S107 + S33 * S83 + S21 * S87 +
S25 * S66 + S42 * S75 + S36 * S76 + S21 * S69 + S12 * S72 + S16 * S102 + S6 * S91 + S23 * S98 + S28 * S70 + (i0) * (i5) * S32 + S48 * S71 + S37 * S85 +
(~i4) * (i7) * S21 + S17 * S68 + S20 * S100 + S20 * S122 + S8 * S112 + S20 * S127 +
S11 * S123 + S11 * S92 + S61 * S68 * S79 + (~i7) * S50 + (~i5) * S47 + (~i6) * S25 +
(i0) * S2 + (i5) * S23 + (i7) * S58 optimized logic (using substitutions) for bit 7

S6 * S78 * S106 + (~i1) * S23 * S60 + (~i7) * S7 * S66 + (~i4) * S2 * S73 + (i3) * S9 * S89 + (i2) * S5 * S88 + (i5) * S1 * S75 +
(i5) * S1 * S71 + (~i6) * S3 * S72 + (~i1) * S25 * S70 + (~i2) * S55 * S64 + (i1) * S3 * S84 + (i7) * S15 * S94 +
(i7) * S4 * S64 + (~i2) * S6 * S68 + (i3) * S0 * S74 + (~i3) * S11 * S118 + (i4) * S11 * S78 + (i5) * S24 * S98 +
(i2) * S13 * S62 + S5 * S124 + S44 * S60 + S10 * S87 + S10 * S97 + S38 * S130 +
S33 * S116 + (~i1) * (~i7) * S15 + S15 * S77 + S21 * S66 + S8 * S97 + S28 * S96 +
S63 * S66 + S95 + S21 * S69 + S12 * S72 + S13 * S108 + S39 * S82 + S34 * S89 +
S41 * S76 + (i0) * (i6) * S16 + S23 * S111 + S0 * S60 + S36 * S68 + S27 * S69 +
S43 * S63 + S30 * S75 + (~i2) * (i3) * S11 + (~i0) * S18 + (~i1) * S64 * S81 + (~i1) * S37 +
(i4) * S27
TOTAL GATES using substitutions (incl. inverters) = 1238
TOTAL LEVELS for the feature = 9

EXAMPLES

Example 1 is an apparatus implementing an Advanced Encryption Standard (AES) substitutions box (S-box) encryption. The apparatus includes an S-box logic function, wherein the S-box logic function takes as input a state and is an 8-bit to 8-bit logic function, and wherein the S-box logic function is minimized such that an S-box round comprises nine not-and (NAND) levels and duplications of a logical product of the minimized S-box logic function are eliminated; and a MixColumns multiplication operation, wherein the MixColumns multiplication operation comprises a plurality of factors that are exclusive ORed (XOR) with an output of the S-box round to obtain a scaled 16-byte output.

Example 2 includes the apparatus of example 1, including or excluding optional features. In this example, an AES round with the S-box logic function and the MixColumns multiplication operation comprise nine NAND levels and five XOR levels.

Example 3 includes the apparatus of any one of examples 1 to 2, including or excluding optional features. In this example, the MixColumns multiplication operation is combined with the S-box logic function, and the combined S-box logic function is minimized such that an AES round comprises nine NAND levels and three XOR levels, and duplications of a logical product of the minimized S-box logic function are eliminated.

Example 4 includes the apparatus of any one of examples 1 to 3, including or excluding optional features. In this example, columns of the scaled 16-byte output are XORed to derive an 8-bit output.

Example 5 includes the apparatus of any one of examples 1 to 4, including or excluding optional features. In this example, minimizing the S-box logic function comprises: expressing the S-box function as a set of implicants; searching the set of implicants for essential implicants and selected implicants; and; expressing the S-box function as the essential implicants and the selected implicants.

Example 6 includes the apparatus of any one of examples 1 to 5, including or excluding optional features. In this example, the MixColumns multiplication operation is combined with the S-box logic function, and minimizing the combined the S-box logic function comprises: expressing the combined S-box function as a set of implicants; searching the set of implicants for essential implicants and selected implicants; and; expressing the combined S-box function as the essential implicants and the selected implicants.

Example 7 includes the apparatus of any one of examples 1 to 6, including or excluding optional features. In this example, duplications of a logical product of the minimized S-box logic function are eliminated by iteratively searching a plurality of regions for substitute logical products.

Example 8 includes the apparatus of any one of examples 1 to 7, including or excluding optional features. In this example, the plurality of factors is obtained from a fixed polynomial such that columns of the state are evaluated as polynomials over GF(28) and multiplied modulo X4+1 with the fixed polynomial.

Example 9 includes the apparatus of any one of examples 1 to 8, including or excluding optional features. In this example, minimizing the S-box logic function is an iterative process that ends when a set of essential primes becomes equal to a set of primes of the S-box logic function.

Example 10 includes the apparatus of any one of examples 1 to 9, including or excluding optional features. In this example, the S-box logic function encrypts data at a processing core and transmits the encrypted data to an L1 cache.

Example 11 is a method to enable an Advanced Encryption Standard (AES) substitution box (S-box). The method includes finding prime implicants of an S-box logic function; determining essential implicants from the prime implicants of the S-box function; minimizing the essential implicants and finding selected implicants; removing duplications from the essential implicants and the selected implicants to obtain final implicants; expressing the S-box logic function as the final implicants; and scaling the S-box logic function expressed as final implicants by factors from a MixColumns multiplication operation.

Example 12 includes the method of example 11, including or excluding optional features. In this example, the S-box logic function and the inverse MixColumns multiplication operation comprise nine NAND levels and five XOR levels.

Example 13 includes the method of any one of examples 11 to 12, including or excluding optional features. In this example, the MixColumns multiplication operation is combined with the S-box logic function, and the combined the S-box logic function is minimized such that an AES round comprises nine NAND levels and three XOR levels, and duplications of a logical product of the minimized S-box logic function are eliminated.

Example 14 includes the method of any one of examples 11 to 13, including or excluding optional features. In this example, columns of an output of the scaled S-box logic function are XORed to derive an 8-bit output.

Example 15 includes the method of any one of examples 11 to 14, including or excluding optional features. In this example, minimizing the essential implicants and finding selected implicants comprises: expressing the S-box function as a set of implicants; searching the set of implicants for essential implicants and selected implicants; and; expressing the S-box function as the essential implicants and the selected implicants.

Example 16 includes the method of any one of examples 11 to 15, including or excluding optional features. In this example, the MixColumns multiplication operation is combined with the S-box logic function, and minimizing the combined the S-box logic function comprises: expressing the combined S-box function as a set of implicants; searching the set of implicants for essential implicants and selected implicants; and; expressing the combined S-box function as the essential implicants and the selected implicants.

Example 17 includes the method of any one of examples 11 to 16, including or excluding optional features. In this example, duplications of a logical product of the minimized S-box logic function are removed by iteratively searching a plurality of regions for substitute logical products.

Example 18 includes the method of any one of examples 11 to 17, including or excluding optional features. In this example, the plurality of factors is obtained from a fixed polynomial such that columns of the state are evaluated as polynomials over $GF(2^8)$ and multiplied modulo $X^4+1$ with the fixed polynomial.

Example 19 includes the method of any one of examples 11 to 18, including or excluding optional features. In this example, the S-box logic function encrypts data at a processing core and transmits the encrypted data to an L1 cache.

Example 20 includes the method of any one of examples 11 to 19, including or excluding optional features. In this example, the S-box logic function is to encrypt data stored in a register of a computing device.

Example 21 is a substitution box (S-box). The substitution box (S-box) includes a logic function, wherein the logic function comprises input bits and substitution bits, is expressed by nine or fewer logic levels, and the total number of logic gates of the logic function is within 1200 to 1250 logic gates.

Example 22 includes the substitution box of example 21, including or excluding optional features. In this example, the substitution bits are derived by iteratively searching a plurality of regions for substitute logical products.

Example 23 includes the substitution box of any one of examples 21 to 22, including or excluding optional features. In this example, the logic function further comprises a MixColumns multiplication operation, wherein the MixColumns multiplication operation comprises a plurality of factors that are exclusive ORed (XOR) with an output of the S-box round to obtain a scaled 16-byte output.

Example 24 includes the substitution box of any one of examples 21 to 23, including or excluding optional features. In this example, the logic function is minimized by expressing the S-box function as a set of implicants, searching the set of implicants for essential implicants and selected implicants, and expressing the S-box function as the essential implicants and the selected implicants.

Example 25 includes the substitution box of any one of examples 21 to 24, including or excluding optional features. In this example, an output of the logic function is XORed to derive an 8-bit output.

Although an example embodiment of the disclosed subject matter is described with reference to block and flow diagrams in FIGS. 1-5, persons of ordinary skill in the art will readily appreciate that many other methods of implementing the disclosed subject matter may alternatively be used. For example, the order of execution of the blocks in flow diagrams may be changed, and/or some of the blocks in block/flow diagrams described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

Program code may represent hardware using a hardware description language or another functional description language which essentially provides a model of how designed hardware is expected to perform. Program code may be assembly or machine language or hardware-definition languages, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine-readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A method to enable an Advanced Encryption Standard (AES) substitution box (S-box), comprising:
   finding, via AES circuitry, prime implicants of an S-box logic function;
   determining, via the AES circuitry, essential implicants from the prime implicants of the S-box function;
   minimizing, via the AES circuitry, the essential implicants and finding selected implicants;
   removing, via the AES circuitry, duplications from the essential implicants and the selected implicants to obtain final implicants;
   expressing, via the AES circuitry, the S-box logic function as the final implicants; and
   scaling, via the AES circuitry, the S-box logic function expressed as final implicants by factors from a MixColumns multiplication operation, wherein the S-box logic function and the MixColumns multiplication operation comprise nine NAND levels and five XOR levels.

2. The method of claim 1, wherein the MixColumns multiplication operation is combined with the S-box logic function, and the combined the S-box logic function is minimized such that an AES round comprises nine NAND levels and three XOR levels, and duplications of a logical product of the minimized S-box logic function are eliminated.

3. The method of claim 1, wherein columns of an output of the scaled S-box logic function are XORed to derive an 8-bit output.

4. The method of claim 1, wherein minimizing the essential implicants and finding selected implicants comprises:
   expressing the S-box function as a set of implicants;
   searching the set of implicants for essential implicants and selected implicants; and;
   expressing the S-box function as the essential implicants and the selected implicants.

5. The method of claim 1, wherein the MixColumns multiplication operation is combined with the S-box logic function, and minimizing the combined the S-box logic function comprises:
   expressing the combined S-box function as a set of implicants;
   searching the set of implicants for essential implicants and selected implicants; and;
   expressing the combined S-box function as the essential implicants and the selected implicants.

6. The method of claim 1, wherein duplications of a logical product of the minimized S-box logic function are removed by iteratively searching a plurality of regions for substitute logical products.

7. The method of claim 1, wherein the plurality of factors is obtained from a fixed polynomial such that columns of the state are evaluated as polynomials over $GF(2^8)$ and multiplied modulo $X^4+1$ with the fixed polynomial.

8. The method of claim 1, wherein the S-box logic function encrypts data at a processing core and transmits the encrypted data to an L1 cache.

9. The method of claim 1, wherein the S-box logic function is to encrypt data stored in a register of a computing device.

* * * * *